(12) United States Patent
Lo et al.

(10) Patent No.: US 10,120,971 B2
(45) Date of Patent: Nov. 6, 2018

(54) INTEGRATED FAN-OUT PACKAGE AND LAYOUT METHOD THEREOF

(71) Applicant: Taiwan Semiconductor Manufacturing Co., Ltd., Hsinchu (TW)

(72) Inventors: Wan-Yu Lo, Taoyuan County (TW); Chin-Chou Liu, Hsinchu County (TW); Kuo-Nan Yang, Hsinchu (TW); Yu-Jen Chang, Taichung (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 0 days.

(21) Appl. No.: 15/250,934

(22) Filed: Aug. 30, 2016

(65) Prior Publication Data

US 2018/0060479 A1    Mar. 1, 2018

(51) Int. Cl.
| | |
|---|---|
| *H01L 23/48* | (2006.01) |
| *G06F 17/50* | (2006.01) |
| *H01L 23/498* | (2006.01) |
| *H01L 23/00* | (2006.01) |
| *H01L 23/31* | (2006.01) |

(52) U.S. Cl.
CPC ...... *G06F 17/5081* (2013.01); *H01L 23/3185* (2013.01); *H01L 23/49816* (2013.01); *H01L 23/49822* (2013.01); *H01L 23/49838* (2013.01); *H01L 24/02* (2013.01); *H01L 24/16* (2013.01); *G06F 2217/40* (2013.01); *G06F 2217/82* (2013.01); *H01L 2224/02331* (2013.01); *H01L 2224/02372* (2013.01); *H01L 2224/02377* (2013.01); *H01L 2224/16235* (2013.01)

(58) Field of Classification Search
CPC ........... H01L 23/3185; H01L 23/49816; H01L 23/49822; H01L 23/49838
USPC .................................................. 257/773, 786
See application file for complete search history.

(56) References Cited

U.S. PATENT DOCUMENTS

| | | | | |
|---|---|---|---|---|
| 5,757,078 | A * | 5/1998 | Matsuda | H01L 23/49816 257/737 |
| 5,814,894 | A * | 9/1998 | Igarashi | H01L 21/563 257/778 |
| 5,847,936 | A * | 12/1998 | Forehand | H05K 1/114 174/250 |
| 5,886,415 | A * | 3/1999 | Akagawa | H01L 23/49816 257/642 |
| 5,892,179 | A * | 4/1999 | Rinne | H01L 24/11 174/261 |
| 5,892,271 | A * | 4/1999 | Takeda | H01L 21/563 257/668 |
| 5,898,223 | A * | 4/1999 | Frye | H01L 23/5221 257/738 |

(Continued)

*Primary Examiner* — Nitin Parekh
(74) *Attorney, Agent, or Firm* — JCIPRNET

(57) ABSTRACT

An integrated fan-out package and a layout method thereof are provided. One integrated fan-out package includes a die and a fan-out substrate. The die has an interconnect structure therein. The fan-out substrate has a redistribution layer structure therein and a plurality of first conductive bumps on a first surface thereof. The first conductive bumps are in physical contact with an interconnect layer of the interconnect structure and a redistribution layer of the redistribution layer structure, and an aspect ratio of the first conductive bumps ranges from about 1/3 to 1/10.

17 Claims, 5 Drawing Sheets

(56) References Cited

U.S. PATENT DOCUMENTS

| | | | |
|---|---|---|---|
| 6,064,114 A * | 5/2000 | Higgins | H01L 23/3114 257/698 |
| 6,222,279 B1 * | 4/2001 | Mis | H01L 21/2885 257/779 |
| 6,552,426 B2 * | 4/2003 | Ishio | H01L 23/3121 257/666 |
| 6,762,122 B2 * | 7/2004 | Mis | H01L 23/50 257/E23.079 |
| 6,897,568 B2 * | 5/2005 | Haimerl | H01L 24/10 257/779 |
| 7,564,115 B2 | 7/2009 | Chen et al. | |
| 7,633,165 B2 | 12/2009 | Hsu et al. | |
| 7,825,024 B2 | 11/2010 | Lin et al. | |
| 7,932,615 B2 * | 4/2011 | Rinne | H01L 23/3114 257/738 |
| 7,973,413 B2 | 7/2011 | Kuo et al. | |
| 8,105,875 B1 | 1/2012 | Hu et al. | |
| 8,158,456 B2 | 4/2012 | Chen et al. | |
| 8,183,578 B2 | 5/2012 | Wang | |
| 8,183,579 B2 | 5/2012 | Wang | |
| 8,227,902 B2 | 7/2012 | Kuo | |
| 8,278,152 B2 | 10/2012 | Liu et al. | |
| 8,361,842 B2 | 1/2013 | Yu et al. | |
| 8,426,961 B2 | 4/2013 | Shih et al. | |
| 8,669,174 B2 | 3/2014 | Wu et al. | |
| 8,680,647 B2 | 3/2014 | Yu et al. | |
| 8,703,542 B2 | 4/2014 | Lin et al. | |
| 8,759,964 B2 | 6/2014 | Pu et al. | |
| 8,778,738 B1 | 7/2014 | Lin et al. | |
| 8,785,299 B2 | 7/2014 | Mao et al. | |
| 8,802,504 B1 | 8/2014 | Hou et al. | |
| 8,803,292 B2 | 8/2014 | Chen et al. | |
| 8,803,306 B1 | 8/2014 | Yu et al. | |
| 8,803,316 B2 | 8/2014 | Lin et al. | |
| 8,809,996 B2 | 8/2014 | Chen et al. | |
| 8,829,676 B2 | 9/2014 | Yu et al. | |
| 8,877,554 B2 | 11/2014 | Tsai et al. | |
| 2004/0262758 A1 * | 12/2004 | Hashimoto | H01L 24/13 257/750 |
| 2007/0205520 A1 * | 9/2007 | Chou | H01L 23/3157 257/780 |
| 2011/0291288 A1 | 12/2011 | Wu et al. | |
| 2013/0062760 A1 | 3/2013 | Hung et al. | |
| 2013/0062761 A1 | 3/2013 | Lin et al. | |
| 2013/0168848 A1 | 7/2013 | Lin et al. | |
| 2013/0264684 A1 | 10/2013 | Yu et al. | |
| 2013/0307140 A1 | 11/2013 | Huang et al. | |
| 2014/0001645 A1 | 1/2014 | Lin et al. | |
| 2014/0203429 A1 | 7/2014 | Yu et al. | |
| 2014/0225222 A1 | 8/2014 | Yu et al. | |
| 2014/0225258 A1 | 8/2014 | Chiu et al. | |
| 2014/0252572 A1 | 9/2014 | Hou et al. | |
| 2014/0252646 A1 | 9/2014 | Hung et al. | |
| 2014/0264930 A1 | 9/2014 | Yu et al. | |
| 2015/0287697 A1 | 10/2015 | Tsai et al. | |
| 2015/0348872 A1 | 12/2015 | Kuo et al. | |

* cited by examiner

INTEGRATED FAN-OUT PACKAGE AND LAYOUT METHOD THEREOF

BACKGROUND

In recent years, the semiconductor industry has experienced rapid growth due to continuous improvement in integration density of various electronic components, e.g., transistors, diodes, resistors, capacitors, etc. For the most part, this improvement in integration density has come from successive reductions in minimum feature size, which allows more components to be integrated into a given area. These smaller electronic components also require smaller packages that utilize less area than previous packages. Some smaller types of packages for semiconductor components include quad flat packages (QFPs), pin grid array (PGA) packages, ball grid array (BGA) packages, and so on. Currently, integrated fan-out packages become increasingly popular for their compactness. How to ensure the reliability of the integrated fan-out packages has drawn high attention in the industry.

DETAILED DESCRIPTION

Figure 1:
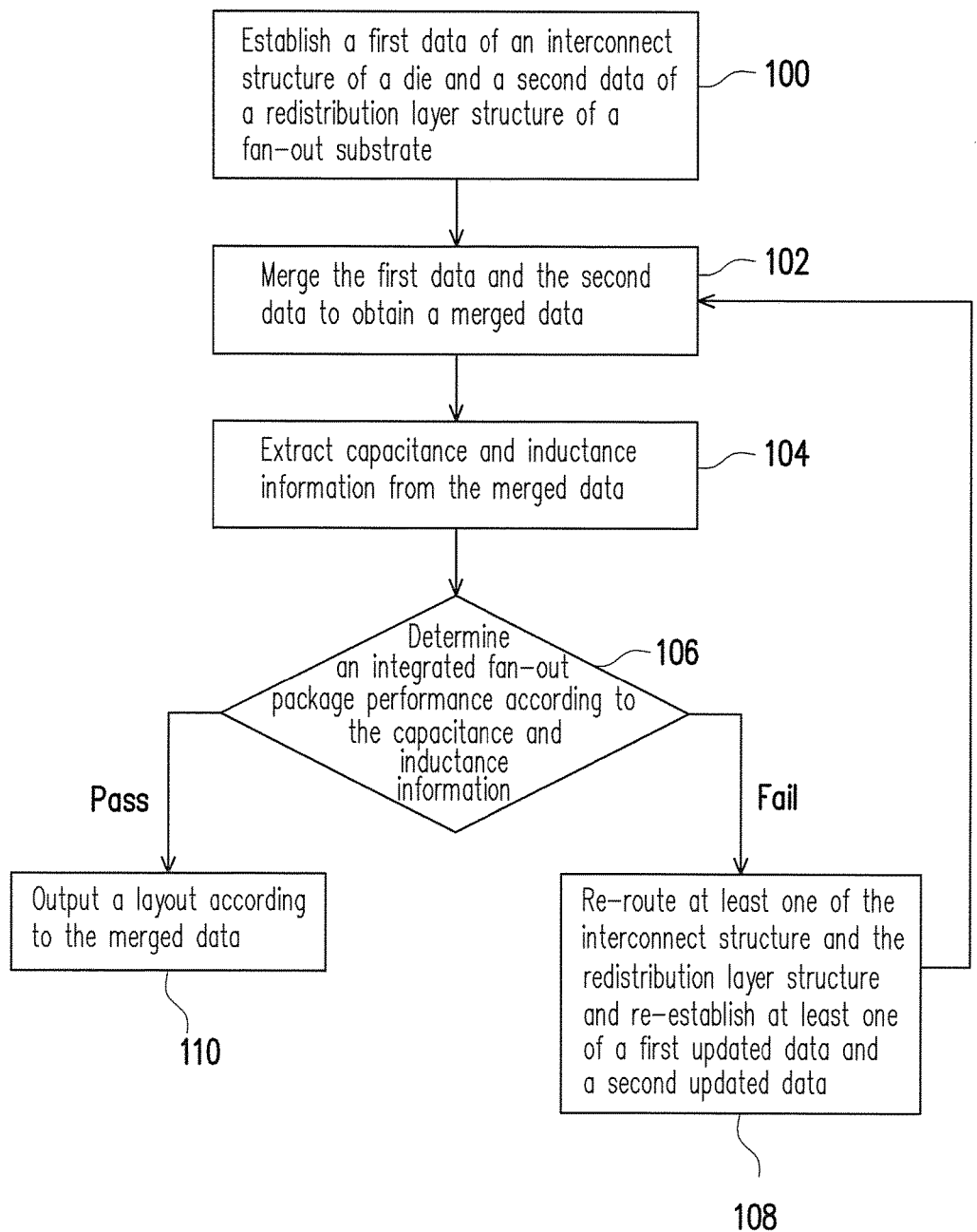
FIG. 1 is a flow chart illustrating a layout method of an integrated fan-out package in accordance with some embodiments.

The following disclosure provides many different embodiments, or examples, for implementing different features of the provided subject matter. Specific examples of components and arrangements are described below for the purposes of conveying the present disclosure in a simplified manner. These are, of course, merely examples and are not intended to be limiting. For example, the formation of a second feature over or on a first feature in the description that follows may include embodiments in which the second and first features are formed in direct contact, and may also include embodiments in which additional features may be formed between the second and first features, such that the second and first features may not be in direct contact. In addition, the same reference numerals and/or letters may be used to refer to the same or similar parts in the various examples the present disclosure. The repeated use of the reference numerals is for the purpose of simplicity and clarity and does not in itself dictate a relationship between the various embodiments and/or configurations discussed.

Further, spatially relative terms, such as "beneath", "below", "lower", "on", "over", "above", "upper" and the like, may be used herein to facilitate the description of one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a flow chart illustrating a layout method of an integrated fan-out package in accordance with some embodiments.

At step 100, a first data of an interconnect structure of a die and a second data of a redistribution layer structure of a fan-out substrate are established. In some embodiments, each of the first data and the second data is possibly made by a computer system that includes, for example but not limited to, a central processing unit, a memory and a storage. In some embodiments, the step of establishing the second data includes placing a plurality of first conductive bumps on a first surface of the fan-out substrate and routing the redistribution layer structure according to positions of the first conductive bumps.

At step 102, the first data and the second data are merged to obtain a merged data. In some embodiments, the merging step is performed by software executed by a processor. In some embodiments, the merging step is performed according to relative positions of the interconnect structure of the die and the redistribution layer structure of the fan-out substrate. In alternative embodiments, the merging step is performed according to relative positions of the uppermost interconnect layer of the die and the lowermost redistribution layer of the fan-out substrate.

At step 104, capacitance and inductance information is extracted from the merged data. In some embodiments, the crosstalk such as capacitance, inductance and resistance or the coupling effect between the die and the fan-out substrate is extracted from the merged data. In alternative embodiments, the crosstalk or coupling effect between the interconnect structure of the die and the redistribution layer structure of the fan-out substrate is extracted from the merged data. In yet alternative embodiments, the crosstalk or coupling effect between the uppermost interconnect layer of the die and the lowermost redistribution layer of the fan-out substrate is extracted from the merged data.

At step 106, an integrated fan-out package performance is determined according to the capacitance and inductance information. In some embodiments, the determining step is performed by software executed by a processor, hardware (e.g., a logic circuit), or a combination thereof. In some embodiments, a specification or standard with acceptable package performance is established, and the package is evaluated to determine whether it passes or fails the specification or standard.

In some embodiments, if the integrated fan-out package performance passes the specification or standard, step 110 is implemented. At step 110, a layout is outputted according to the merged data. An integrated fan-out package is then manufactured according to the layout.

In alternative embodiments, if the integrated fan-out package performance fails the specification or standard, step 108 is implemented. At step 108, at least one of the interconnect structure and the redistribution layer structure is re-routed and at least one of a first updated data and a second updated data is re-established. In some embodiments, the re-routing step includes adjusting a region wherein an interconnect layer (e.g., the uppermost interconnect layer) is overlapped with a redistribution layer (e.g., the lowermost redistribution layer) to be smaller than a preset or predetermined value. In some embodiments, the re-routing step further includes changing a size or pitch of the first conductive bumps. Specifically, the width, height and/or aspect ratio of the first conductive bumps and/or the distance between adjacent first conductive bumps can be adjusted as needed. Steps 102 to 106 are repeated after step 108, until the integrated fan-out package performance passes the specification or standard.

In some embodiments, not only conductive layer(s) (interconnect layer and/or redistribution layer) but also insulating layer(s) (dielectric layer and/or polymer layer) adjacent to the conductive layer(s) can be adjusted upon the design requirement.

In some embodiments, the layout method further includes establishing a third data of a dielectric layer between the interconnect structure and the redistribution layer structure, and the merging step (step 102) further includes merging the first data, the second data and the third data to obtain the merged data. In some embodiments, the dielectric constant of the dielectric layer is adjusted if the integrated fan-out package performance fails the specification or standard.

As the integrated fan-out package becomes scaled down, the distance from the fan-out substrate to the die is accordingly reduced. The coupling effect is rather critical between the interface layers, facing each other, of the fan-out substrate and the die. With the layout method of the disclosure, the coupling effect can be predicated at an early design-stage, so the integrated fan-out package can be manufactured with acceptable performance.

Specifically, in response to determining the integrated fan-out package performance as failed according to the capacitance and inductance information, at least one layer of the interconnect structure and the redistribution layer structure is re-routed and/or a dielectric constant of a dielectric layer between the interconnect structure and the redistribution layer structure is adjusted. For example, by replacing the bump design, changing the dielectric material, and re-routing the interconnect layer(s) and/or the redistribution layer(s), the layout and therefore the integrated fan-out package can meet the customer's requirement.

Figure 2A:
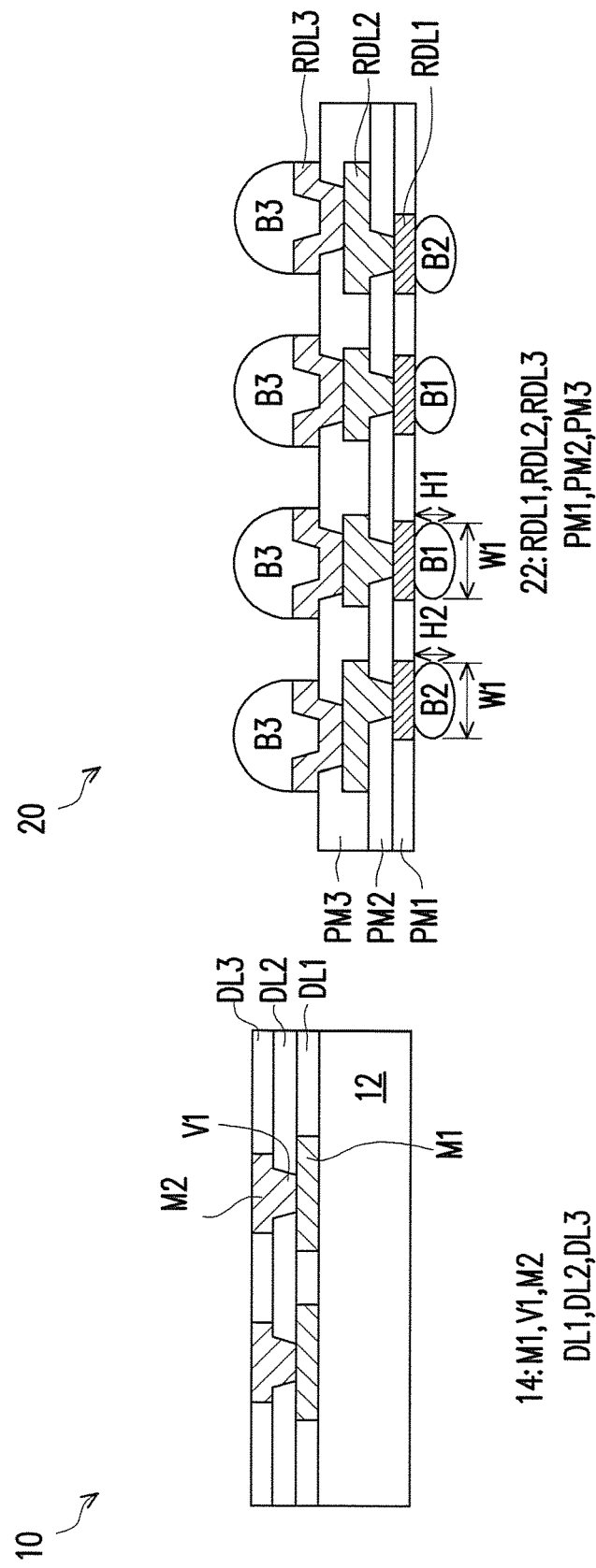
FIG. 2A to FIG. 2B are cross-sectional views of an integrated fan-out package in accordance with some embodiments.
Figure 2B:
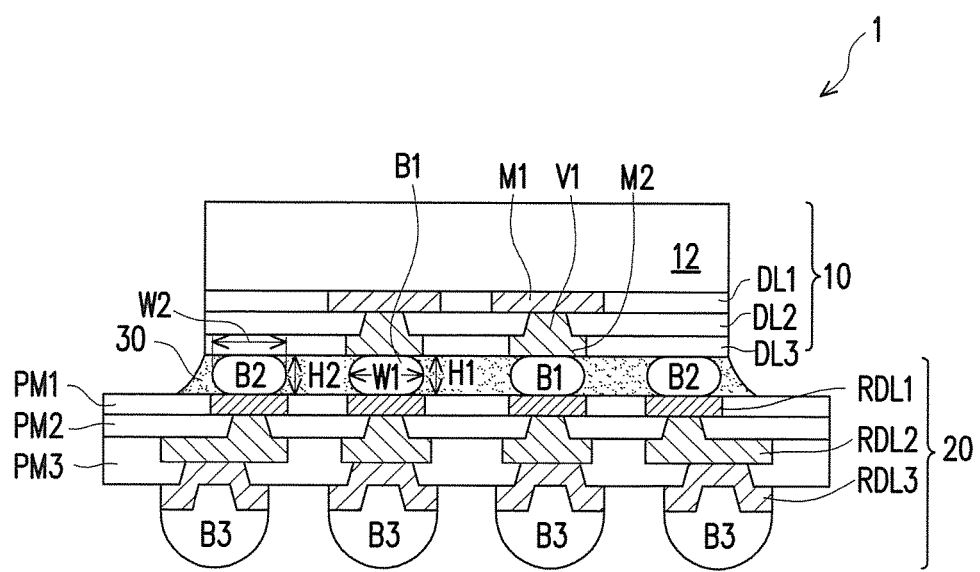

FIG. 2A to FIG. 2B are cross-sectional views of an integrated fan-out package in accordance with some embodiments. The integrated fan-out package is manufactured according to the layout obtained by the method described above.

Referring to FIG. 2A, a die 10 and a fan-out substrate 20 are provided. In some embodiments, the chip 10 has a substrate 12 and an interconnect structure 14 therein. In some embodiments, the substrate 12 includes an elementary semiconductor such as silicon or germanium and/or a compound semiconductor such as silicon germanium, silicon carbide, gallium arsenic, indium arsenide, gallium nitride or indium phosphide. In some embodiments, the substrate 12 may take the form of a planar substrate, a substrate with multiple fins, nanowires, or other forms known to people having ordinary skill in the art. In some embodiments, a device layer (not shown) may be formed in the substrate 12, and may include a gate, source/drains and optional through silicon vias (TSV).

The interconnect structure 14 is formed over the substrate 12. In some embodiments, the interconnect structure 14 includes a plurality of interconnect layers and a plurality of vias between two adjacent interconnect layers and embedded by a dielectric layer. For example, the interconnect structure 14 includes interconnect layers M1 and M2, vias V1 and dielectric layers DL1 to DL3. The number of the interconnect layers, vias or dielectric layers is not limited by the disclosure.

Specifically, the interconnect layer M1 is embedded by the dielectric layer DL1. The interconnect layer M2 and vias V1 are electrically connected to the interconnect layer M1 and respectively embedded by the dielectric layers DL2 and DL3. Each of the interconnect layers M1 and M2 and vias V1 includes a diffusion barrier layer and a metal layer over the diffusion barrier layer. The diffusion barrier layer may include titanium, titanium nitride, tantalum, tantalum nitride, a combination thereof, or the like. The metal layer may include copper, a copper alloy, silver, gold, tungsten, aluminum, a combination thereof, or the like, and may be formed by an electroplating process or a suitable technique.

In some embodiments, each of the dielectric layers DL1 to DL3 is formed of a low-k dielectric material having a dielectric constant (k-value) equal to or less than about 3.0, about 2.5, or even lower. In some embodiments, each of the dielectric layers DL1 to DL3 includes Black Diamond (a registered trademark of Applied Materials), a carbon-containing low-k dielectric material, Hydrogen SilsesQuioxane (HSQ), MethylSilsesQuioxane (MSQ), or the like. In some embodiments, an exemplary low-k inorganic material is carbon doped silicon dioxide (C-oxide) formed by a CVD process where the dielectric constant may be varied over a range depending on the process conditions. For example, C-oxide may be formed with a dielectric constant over a range of about 2.0 to about 3.0 and a density of about 1.3 g/cm3 compared to a dielectric constant of about 4.1 and a density of about 2.3 g/cm3 for silicon dioxides (e.g., un-doped TEOS). Other exemplary low-k inorganic materials include porous oxides, xerogels, or SOG (spin-on glass). Exemplary low-k organic materials include polysilsequioxane, parylene, polyimide, benzocyclobutene and amorphous Teflon. In alternative embodiments, each of the dielectric layers DL1 to DL3 is formed of a non-low-k dielectric material such as silicon oxide, silicon nitride, silicon carbide, silicon oxynitride, or the like.

In some embodiments, an etch stop layer is disposed between two adjacent dielectric layers. The etch stop layer may include silicon carbide, silicon nitride, silicon oxynitride, silicon carbo-nitride, a combination thereof, or the like. The etch stop layer is formed of a material that has a high etching selectivity relative to the overlying dielectric layer.

In some embodiments, the fan-out substrate 20 has a redistribution layer structure 22 therein, a plurality of first conductive bumps B1 and a plurality of second conductive bumps B2 on a first surface thereof, and a plurality of third bumps B3 on a second side opposite to the first side thereof.

In some embodiments, the redistribution layer structure 22 includes a plurality of polymer layers PM1, PM2 and PM3 and a plurality of redistribution layers RDL1, RDL2 and RDL3 stacked alternately. The number of the polymer layers or the redistribution layers is not limited by the disclosure.

Specifically, the redistribution layer RDL1 is electrically connected to the first and second conductive bumps B1 and B2 and penetrates through the polymer layer PM1. The redistribution layer RDL2 is electrically connected to the redistribution layer RDL1 and penetrates through the polymer layer PM2. The redistribution layer RDL3 is electrically connected to the redistribution layer RDL2 and penetrates through the polymer layer PM3. In some embodiments, the uppermost redistribution layer RDL3 is also called an under-ball metallurgy (UBM) layer for ball mount. In some embodiments, each of the polymer layers PM1, PM2 and PM3 may include a photo-sensitive material such as polybenzoxazole (PBO), polyimide (PI), benzocyclobutene (BCB), a combination thereof or the like. In some embodiments, each of the polymer layers PM1, PM2 and PM3 can include a low-k dielectric material having a dielectric constant (k-value) equal to or less than about 3.0, about 2.5, or even lower. In alternative embodiments, each of the polymer layers PM1, PM2 and PM3 can include a non-low-k dielectric material. The low-k and non-low-k dielectric materials have been described above, and the details are not iterated herein. In some embodiments, each of the redistribution layers RDL1, RDL2 and RDL3 may include copper, nickel, titanium, a combination thereof or the like, and may be formed by an electroplating process or a suitable technique.

In some embodiments, the first and second bumps B1 and B2 are made of a conductive material with low resistivity, such as Sn, Pb, Ag, Cu, Ni, Bi or an alloy thereof, and are formed by a suitable process such as evaporation, plating, ball drop, or screen printing.

In some embodiments, the aspect ratio (height H1/width W1) of the first conductive bumps B1 ranges from about 1/3 to 1/10. In some embodiments, the aspect ratio of the first conductive bumps B1 can be, for example but not limited to, about 1/3, 1/4, 1/5, 1/6, 1/7, 1/8, 1/9, 1/10, including any range between any two of the preceding values. In some embodiments, the width W1 of the first conductive bumps B1 is about 5 μm to 10 μm. For example, the width W1 of the first conductive bumps B1 can be, for example but not limited to, about 5 μm, 6 μm, 7 μm, 8 μm, 9 μm, 10 μm, including any range between any two of the preceding values.

In some embodiments, the aspect ratio (height H2/width W2) of the second conductive bumps B2 ranges from about 3 to 1/10. In some embodiments, the aspect ratio of the second conductive bumps B2 can be, for example but not limited to, about 3, 2, 1, 1/2, 1/3, 1/4, 1/5, 1/6, 1/7, 1/8, 1/9, 1/10, including any range between any two of the preceding values. In some embodiments, the width W2 of the second conductive bumps B2 is about 0.5 μm to 10 μm. For example, the width W2 of the second conductive bumps B2 can be, for example but not limited to, about 0.5 μm, 1 μm, 2 μm, 3 μm, 4 μm, 10 μm 5 μm, 6 μm, 7 μm, 8 μm, 9 μm, 10 μm, including any range between any two of the preceding values.

In some embodiments, the aspect ratio of the first conductive bumps B1 is the same as the aspect ratio of the second conductive bumps B2. In alternative embodiments, the aspect ratio of the first conductive bumps B1 is different from the aspect ratio of the second conductive bumps B2. For example, the aspect ratio of the first conductive bumps B1 can be smaller than or greater than the aspect ratio of the second conductive bumps B2.

The third conductive bumps B3 or balls are electrically connected to the redistribution layer RDL3 of the redistribution layer structure 22. In some embodiments, the third conductive bumps B3 are made of a conductive material with low resistivity, such as Sn, Pb, Ag, Cu, Ni, Bi or an alloy thereof, and are formed by a suitable process such as evaporation, plating, ball drop, or screen printing.

Referring to FIG. 2B, the die 10 is bonded to the fan-out substrate 20 through the first conductive bumps B1. In some embodiments, the first conductive bumps B1 are in physical contact with the interconnect layer M2 of the interconnect structure 14 and the redistribution layer D3 of the redistribution layer structure 22.

In some embodiments, the first conductive bumps B1 are configured to connect the lowermost redistribution layer RDL1 to the uppermost interconnect layer M2, and the second conductive bumps B2 are configured to connect the lowermost redistribution layer RDL1 to the another conductive feather rather than the uppermost interconnect layer M2. In such case, the contact areas between the first conductive bumps B1 and the uppermost interconnect layer M2 (or the lowermost redistribution layer RDL1) are designed to be the same or even greater than the contact areas between the second conductive bumps B2 and the uppermost interconnect layer M2 (or the lowermost redistribution layer RDL1), so as to reduce the coupling effect between the die 10 and the fan-out substrate 20.

Thereafter, an under-fill layer or a dielectric layer 30 is formed to fill the space between the die 10 and the fan-out substrate 20. In some embodiments, the dielectric layer 30 encapsulates or surrounds the first and second conductive bumps B1 and B2. In some embodiments, the dielectric layer 30 includes a low-k dielectric material having a dielectric constant (k-value) equal to or less than about 3.0, about 2.5, or even lower. In alternative embodiments, the dielectric layer 30 can include a non-low-k dielectric material. The low-k and non-low-k dielectric materials have been described above, and the details are not iterated herein. An integrated fan-out package 1 is thus completed.

In some embodiments, the interconnect layer M2 and the redistribution layer RDL1 are designed in a manner such that the region wherein the interconnect layer M2 is overlapped with the redistribution layer RDL1 is smaller than a preset value.

Figure 3:
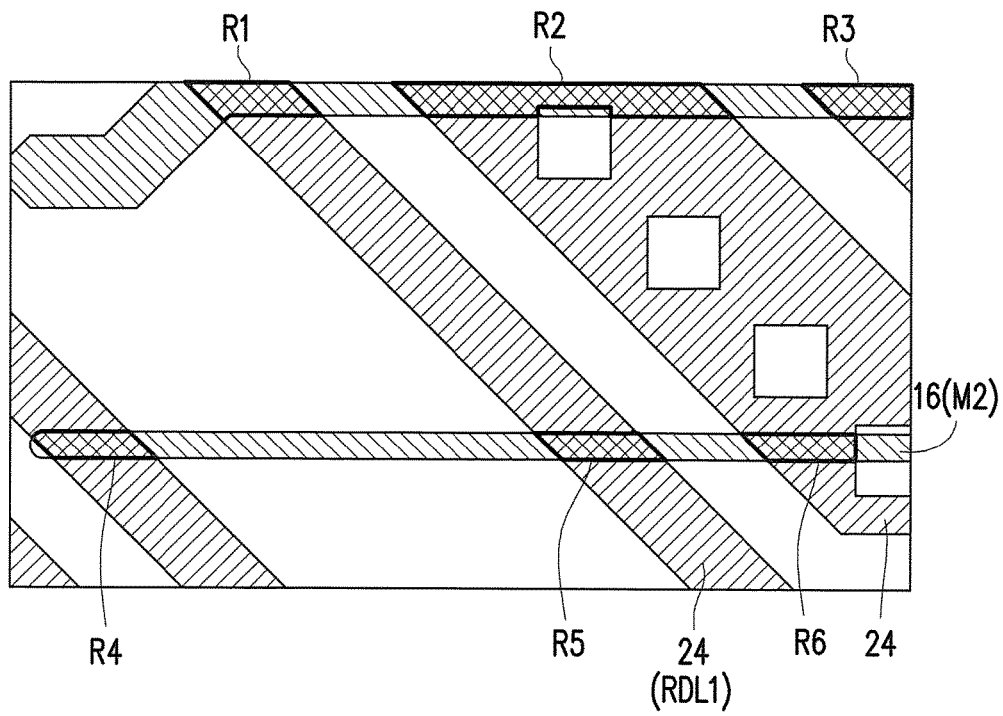
FIG. 3 is a simplified top view of an uppermost interconnect layer of an interconnect structure and a lowermost redistribution layer of a redistribution layer structure in accordance with some embodiments.
Figure 4:
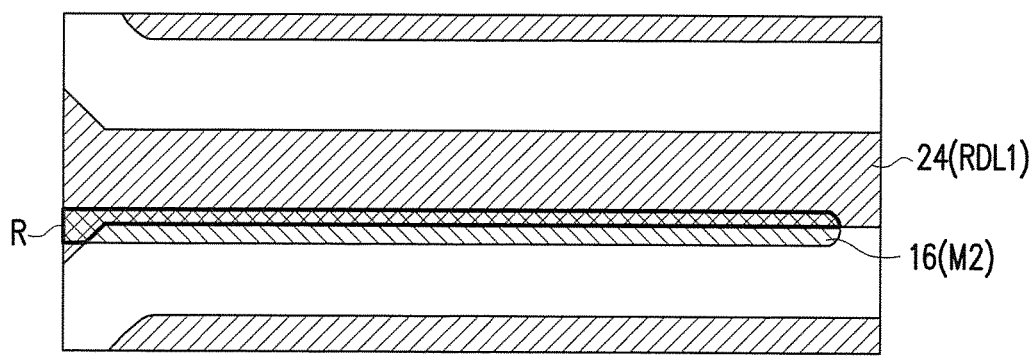
FIG. 4 is a simplified top view of an uppermost interconnect layer of an interconnect structure and a lowermost redistribution layer of a redistribution layer structure in accordance with alternative embodiments.

In some embodiments, as shown in top views of FIG. 3 and FIG. 4, the interconnect layer M2 includes a plurality of first conductive lines 16, the redistribution layer RDL1 includes a plurality of second conductive lines 24. In some embodiments, the first conductive lines 16 are non-parallel to (in some embodiments, perpendicular to) the second conductive lines 24, and the overlapped region, from a top view, includes first to sixth overlapped regions R1 to R6, as shown in FIG. 3. The sum of the first to sixth overlapped regions R1 to R6 of the first and second conductive lines 16 and 24 is designed to be less than a preset value. In alternative embodiments, at least one of the first conductive lines 16 is parallel to the second conductive lines 24, as shown in FIG. 4. The overlapped region R of the first and second conductive lines 16 and 24 is designed to be less than a preset value. By such disposition/design, the coupling effect between the die 10 and the fan-out substrate 20 can be minimized, and the package performance can be accordingly improved.

The integrated fan-out packages of the disclosure are described below with reference to FIG. 2B, FIG. 5 and FIG. 6.

Figure 5:
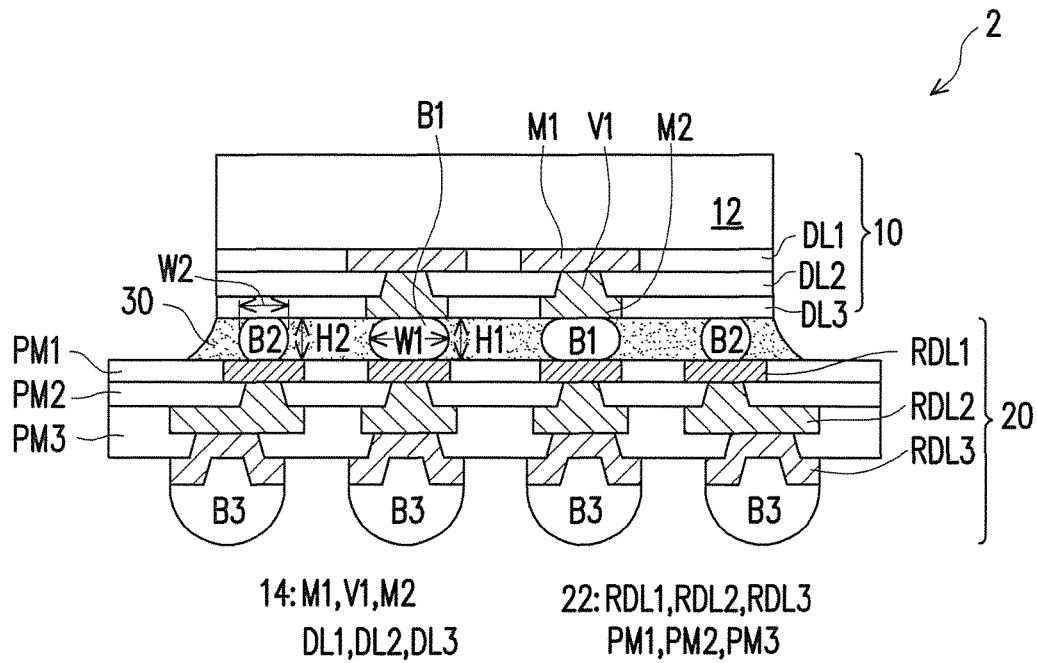
FIG. 5 to FIG. 6 are cross-sectional views of integrated fan-out packages in accordance with alternative embodiments.
Figure 6:
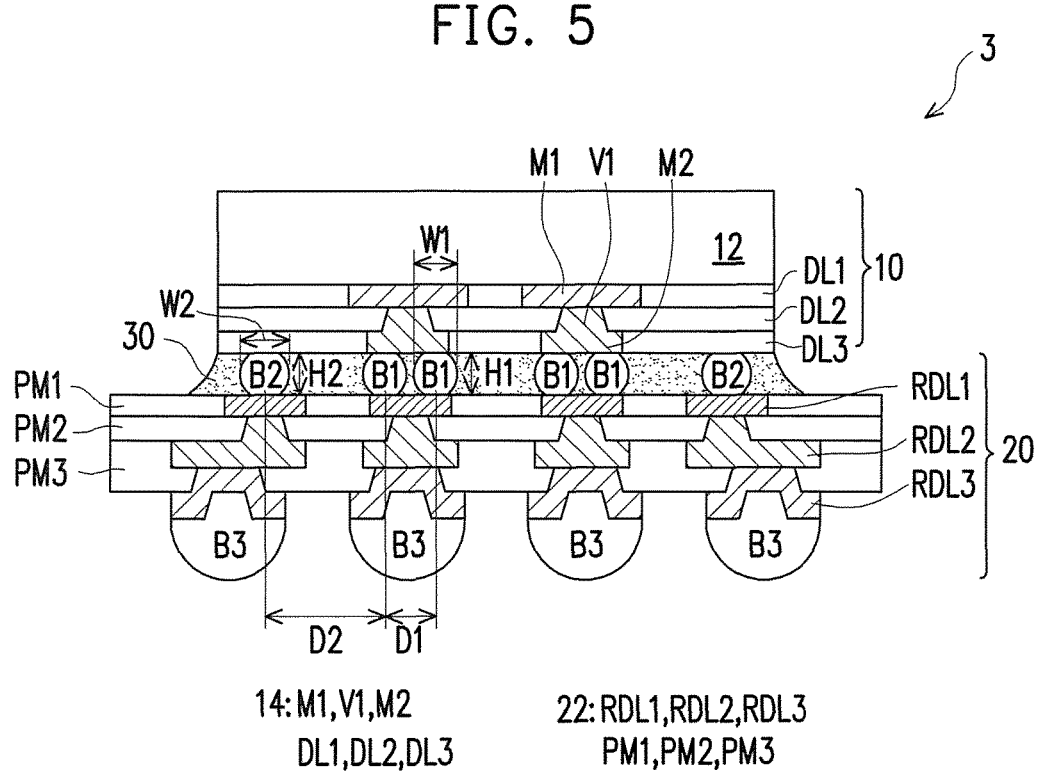

Referring to FIG. 2B and FIG. 4 and FIG. 5, an integrated fan-out package 1/2/3 includes a die 10 and a fan-out substrate 20. The die 10 has an interconnect structure 14 therein. The fan-out substrate 20 has a redistribution layer structure 22 therein and a plurality of first conductive bumps B1 on a first surface thereof. The first conductive bumps B1 are in physical contact with an interconnect layer M2 of the interconnect structure 14 and a redistribution layer RDL1 of the redistribution layer structure 22, and the aspect ratio of the first conductive bumps B1 ranges from about 1/3 to 1/10, such as 1/5 to 1/8. The width of the first conductive bumps B1 is about 5 μm to 10 μm.

In some embodiments, the integrated fan-out package 1/2/3 further includes a dielectric layer 30 encapsulating the first conductive bumps B1, and the dielectric constant of the dielectric layer 30 is equal to or less than about 3.

In some embodiments, as shown in top views of FIG. 3 and FIG. 4, the interconnect layer M2 includes a plurality of first conductive lines 16, the redistribution layer RDL1 includes a plurality of second conductive lines 24. In some embodiments, the overlapped region of the first and second conductive lines 16 and 24 is less than a preset value.

In some embodiments, the fan-out substrate 20 further has a plurality of second conductive bumps B2 on the first surface thereof and aside the first conductive bumps B1. The second conductive bumps B2 is in physical contact with the redistribution layer RDL1 of the redistribution layer structure 22 but not in physical contact with the interconnect layer M2 of the interconnect structure 14.

In some embodiments, the aspect ratio (height H2/width W2) of the second conductive bumps B2 is the same as the aspect ratio (height H1/width W1) of the first conductive bumps B1, as shown in the integrated fan-out package 1/3 of FIG. 2B and FIG. 5. The difference between the integrated fan-out package 1 and the integrated fan-out package 3 lies in that the first conductive bumps B1 in FIG. 2B has a single-bump configuration (in this cross-section) between the corresponding lines of the interconnect layer M2 and the redistribution layer RDL1, while the first conductive bumps B1 in FIG. 5 has double-bump configuration (in this cross-section) between the corresponding lines of the interconnect layer M2 and the redistribution layer RDL1.

From another point of view, in the double-bump configuration, the distance D1 between the neighboring first conductive bumps B1 is smaller than the distance D2 from the edge first conductive bump B1 to the adjacent second conductive bump B2, as shown in FIG. 5. In some embodiments, in another cross-section (not shown), the pitch between the first conductive bumps B1 is smaller than the pitch between the second conductive bumps B2.

In alternative embodiments, upon the design requirement, the first conductive bumps B1 can have a triple-bump or multi-bump configuration (in certain cross-section) between the corresponding lines of the interconnect layer M2 and the redistribution layer RDL1 upon the design requirement.

In yet alternative embodiments, the aspect ratio (height H2/width W2) of the second conductive bumps B2 is different from (e.g., smaller than) the aspect ratio (height H1/width W1) of the first conductive bumps B1, as shown in the integrated fan-out package 2 of FIG. 4.

In view of the above, with the layout method of the disclosure, the coupling effect can be predicated at an early design-stage, so the integrated fan-out package can be manufactured with acceptable performance, and the reliability of the integrated fan-out package can be accordingly improved.

In accordance with some embodiments of the present disclosure, an integrated fan-out package includes a die and a fan-out substrate. The die has an interconnect structure therein. The fan-out substrate has a redistribution layer structure therein and a plurality of first conductive bumps on a first surface thereof. The first conductive bumps are in physical contact with an interconnect layer of the interconnect structure and a redistribution layer of the redistribution layer structure, and an aspect ratio of the first conductive bumps ranges from about 1/3 to 1/10.

In accordance with alternative embodiments of the present disclosure, an integrated fan-out package includes a die and a fan-out substrate. The die has an interconnect structure therein. The fan-out substrate has a redistribution layer structure therein and a plurality of first conductive bumps on a first surface thereof. The first conductive bumps are in physical contact with an interconnect layer of the interconnect structure and a redistribution layer of the redistribution layer structure, and a region wherein the interconnect layer is overlapped with the redistribution layer is smaller than a preset value.

In accordance with yet alternative embodiments of the present disclosure, a layout method of an integrated fan-out package includes the following steps. A first data of an interconnect structure of a die and a second data of a redistribution layer structure of a fan-out substrate are established. The first data and the second data are merged to obtain a merged data. Capacitance and inductance information is extracted from the merged data. An integrated fan-out package performance is determined according to the capacitance and inductance information. At least one of the interconnect structure and the redistribution layer structure is re-routed if the integrated fan-out package performance is determined to be failed.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated fan-out package, comprising:
    a die having an interconnect structure therein; and
    a fan-out substrate having a conductive redistribution layer structure therein and a plurality of first conductive bumps on a first surface thereof,
    wherein the first conductive bumps are in physical contact with an interconnect layer of the interconnect structure and a conductive redistribution layer of the conductive redistribution layer structure,
    wherein the fan-out substrate further has a plurality of second conductive bumps on the first surface thereof and aside the first conductive bumps, and the second conductive bumps are not in physical contact with the interconnect layer but in physical contact with the conductive redistribution layer, and
    wherein the first and second conductive bumps are overlapped with each of the fan-out substrate and the die, and an underfill layer encapsulates the first and second conductive bumps.

2. The integrated fan-out package of claim 1, wherein an aspect ratio of the first conductive bumps ranges from about 1/5 to 1/8.

3. The integrated fan-out package of claim 1, wherein a width of the first conductive bumps is about 5 μm to 10 μm.

4. The integrated fan-out package of claim 1, further comprising a dielectric layer encapsulating the first conductive bumps, wherein a dielectric constant of the dielectric layer is equal to or less than about 3.

5. The integrated fan-out package of claim 1, wherein the interconnect layer comprises a plurality of first conductive lines, the conductive redistribution layer comprises a plurality of second conductive lines, and an area of a total of overlapped regions of the first and second conductive lines is less than a preset value determined by an integrated fan-out package performance according to capacitance and inductance information or a coupling effect between the die and the fan-out substrate.

6. The integrated fan-out package of claim 1, wherein the interconnect layer comprises a plurality of first conductive lines, the conductive redistribution layer comprises a plurality of second conductive lines, and the first conductive lines are non-parallel to the second conductive lines.

7. The integrated fan-out package of claim 1, wherein an aspect ratio of the second conductive bumps is the same as an aspect ratio of the first conductive bumps.

8. The integrated fan-out package of claim 1, wherein an aspect ratio of the second conductive bumps is different from an aspect ratio of the first conductive bumps.

9. The integrated fan-out package of claim 1, wherein an aspect ratio of the first conductive bumps ranges from about 1/3 to 1/10.

10. An integrated fan-out package, comprising:
a die having an interconnect structure therein; and
a fan-out substrate having a conductive redistribution layer structure therein and a plurality of first conductive bumps and a plurality of second conductive bumps on a first surface thereof,
wherein the first conductive bumps are in physical contact with an interconnect layer of the interconnect structure and a conductive redistribution layer of the conductive redistribution layer structure, and the second conductive bumps are not in physical contact with the interconnect layer but in physical contact with the conductive redistribution layer, and
wherein the interconnect layer of the interconnect structure comprises a plurality of first conductive lines, the conductive redistribution layer of the conductive redistribution layer structure comprises a plurality of second conductive lines, the first conductive lines of the die are, in a top view, non-parallel to the second conductive lines of the fan-out substrate, and in the top view, an area of a total of regions where the first conductive lines of the interconnect layer of the die are overlapped with the second conductive lines of the conductive redistribution layer of the fan-out substrate is smaller than a preset value determined by an integrated fan-out package performance according to capacitance and inductance information or a coupling effect between the die and the fan-out substrate, wherein the plurality of first conductive bumps and the plurality of second conductive bumps are overlapped with each of the fan-out substrate and the die.

11. The integrated fan-out package of claim 10, further comprising a dielectric layer encapsulating the first conductive bumps, wherein a dielectric constant of the dielectric layer is equal to or less than about 3.

12. The integrated fan-out package of claim 10, wherein an aspect ratio of the second conductive bumps is the same as the aspect ratio of the first conductive bumps.

13. The integrated fan-out package of claim 10, wherein an aspect ratio of the second conductive bumps is different from the aspect ratio of the first conductive bumps.

14. An integrated fan-out package, comprising:
a die having an interconnect structure therein; and
a fan-out substrate having a conductive redistribution layer structure therein and a plurality of first conductive bumps and a plurality of second conductive bumps on a first surface thereof,
wherein the first conductive bumps are in physical contact with an interconnect layer of the interconnect structure and a conductive redistribution layer of the conductive redistribution layer structure, and the second conductive bumps are not in physical contact with the interconnect layer but in physical contact with the conductive redistribution layer, and
wherein the interconnect layer of the interconnect structure comprises a plurality of first conductive lines, the conductive redistribution layer of the conductive redistribution layer structure comprises a plurality of second conductive lines, at least some of the first conductive lines of the die are, in a top view, parallel to the second conductive lines of the fan-out substrate, and in the top view, an area of a total of regions where the first conductive lines of the interconnect layer of the die are overlapped with the second conductive lines of the conductive redistribution layer of the fan-out substrate is smaller than a preset value determined by an integrated fan-out package performance according to capacitance and inductance information or a coupling effect between the die and the fan-out substrate, wherein the plurality of first conductive bumps and the plurality of second conductive bumps are overlapped with each of the fan-out substrate and the die.

15. The integrated fan-out package of claim 14, further comprising a dielectric layer encapsulating the first conductive bumps, wherein a dielectric constant of the dielectric layer is equal to or less than about 3.

16. The integrated fan-out package of claim 14, wherein an aspect ratio of the second conductive bumps is the same as the aspect ratio of the first conductive bumps.

17. The integrated fan-out package of claim 14, wherein an aspect ratio of the second conductive bumps is different from the aspect ratio of the first conductive bumps.

* * * * *